United States Patent [19]

Tepas, Jr.

[11] 3,912,627

[45] Oct. 14, 1975

[54] DISSOLVING AND DISPENSING WATER SOLUBLE MATERIAL CONTAINING AVAILABLE CHLORINE TO A SWIMMING POOL

[75] Inventor: Joseph J. Tepas, Jr., Easton, Conn.

[73] Assignee: Olin Corporation, New Haven, Conn.

[22] Filed: June 11, 1973

[21] Appl. No.: 368,900

Related U.S. Application Data

[63] Continuation-in-part of Ser. No. 285,714, Sept. 1, 1972, abandoned.

[52] U.S. Cl. ............... 210/60; 210/62; 210/169; 239/310; 23/267 C; 23/272.8; 23/267 E; 23/272.7; 423/462; 423/658.5; 137/268; 222/57
[51] Int. Cl. ............... B01d 11/02; C01b 3/06
[58] Field of Search ........... 23/267 E, 272.7, 272.8, 23/269, 267 C; 210/169, 60, 62, 64; 423/462; 137/268; 239/310

[56] References Cited
UNITED STATES PATENTS

| | | | |
|---|---|---|---|
| 2,123,212 | 7/1938 | Scholler | 23/272 |
| 2,538,720 | 1/1951 | Wood | 23/267 E |
| 2,968,721 | 1/1961 | Shapiro | 23/272 |
| 3,094,134 | 6/1963 | Currie | 23/267 E |
| 3,156,532 | 11/1964 | Doering | 23/272 |
| 3,194,437 | 7/1965 | Toelke | 23/267 R |
| 3,203,440 | 8/1965 | Schneider | 23/267 E |
| 3,281,015 | 10/1966 | Streb | 23/269 R |
| 3,292,789 | 12/1966 | O'Connor | 23/272 AM |
| 3,425,809 | 2/1969 | Harbaugh | 23/272.7 |
| 3,495,948 | 2/1970 | Long | 23/267 E |
| 3,540,590 | 11/1970 | Schneider | 23/267 E |
| 3,579,440 | 5/1971 | Bradley | 23/267 E |
| 3,595,786 | 7/1971 | Horvath | 23/267 E |
| 3,638,833 | 2/1972 | Lucas | 23/267 E |
| 3,710,817 | 1/1973 | Lorenzen | 23/262 E |
| 3,727,889 | 4/1973 | Nagel | 23/267 E |

FOREIGN PATENTS OR APPLICATIONS

| | | | |
|---|---|---|---|
| 1,050,311 | 2/1959 | Germany | 23/269 |

*Primary Examiner*—A. Louis Monacell
*Assistant Examiner*—S. J. Emery
*Attorney, Agent, or Firm*—James B. Haglind; Donald F. Clements; Thomas P. O'Day

[57] ABSTRACT

A method for dissolving and dispensing soluble material by accumulating liquid in a receptacle and periodically discharging the liquid by rotary means into a dissolving zone. In the dissolving zone, the liquid is contacted with a soluble solid such as calcium hypochlorite to form a solution. The solution is released noncontinuously, in a period of time less than that required to accumulate and discharge the liquid from the rotary means.

The method provides means for dispensing a wide range of concentrations of solutions, for example, solutions containing carefully controlled amounts of available chlorine which can be supplied to a swimming pool. Using the method eliminates the need for periodic superchlorination procedures used in swimming pools to oxidize organic materials and destroy algae which are not eliminated by normal available chlorine concentrations.

7 Claims, 5 Drawing Figures

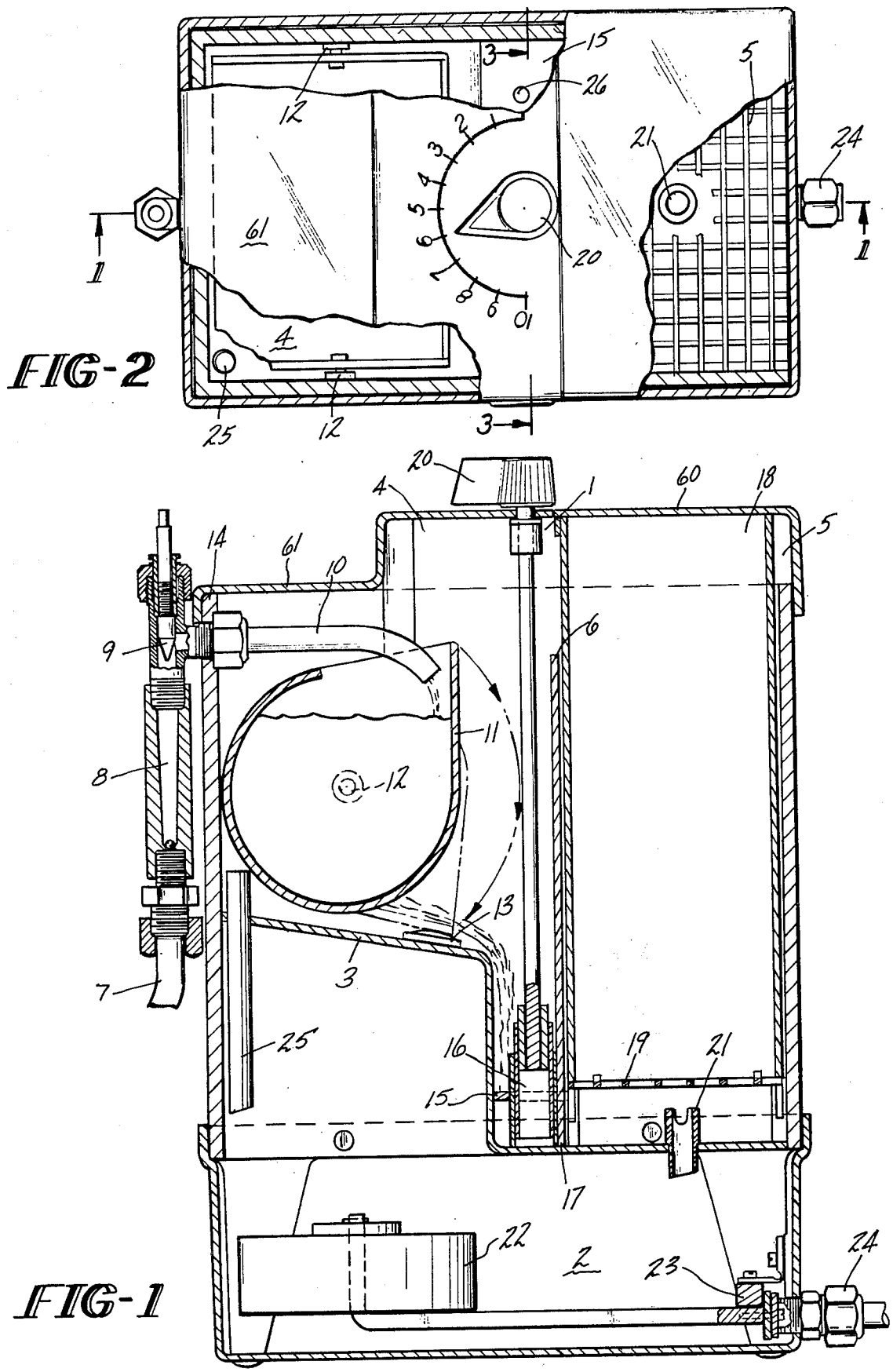

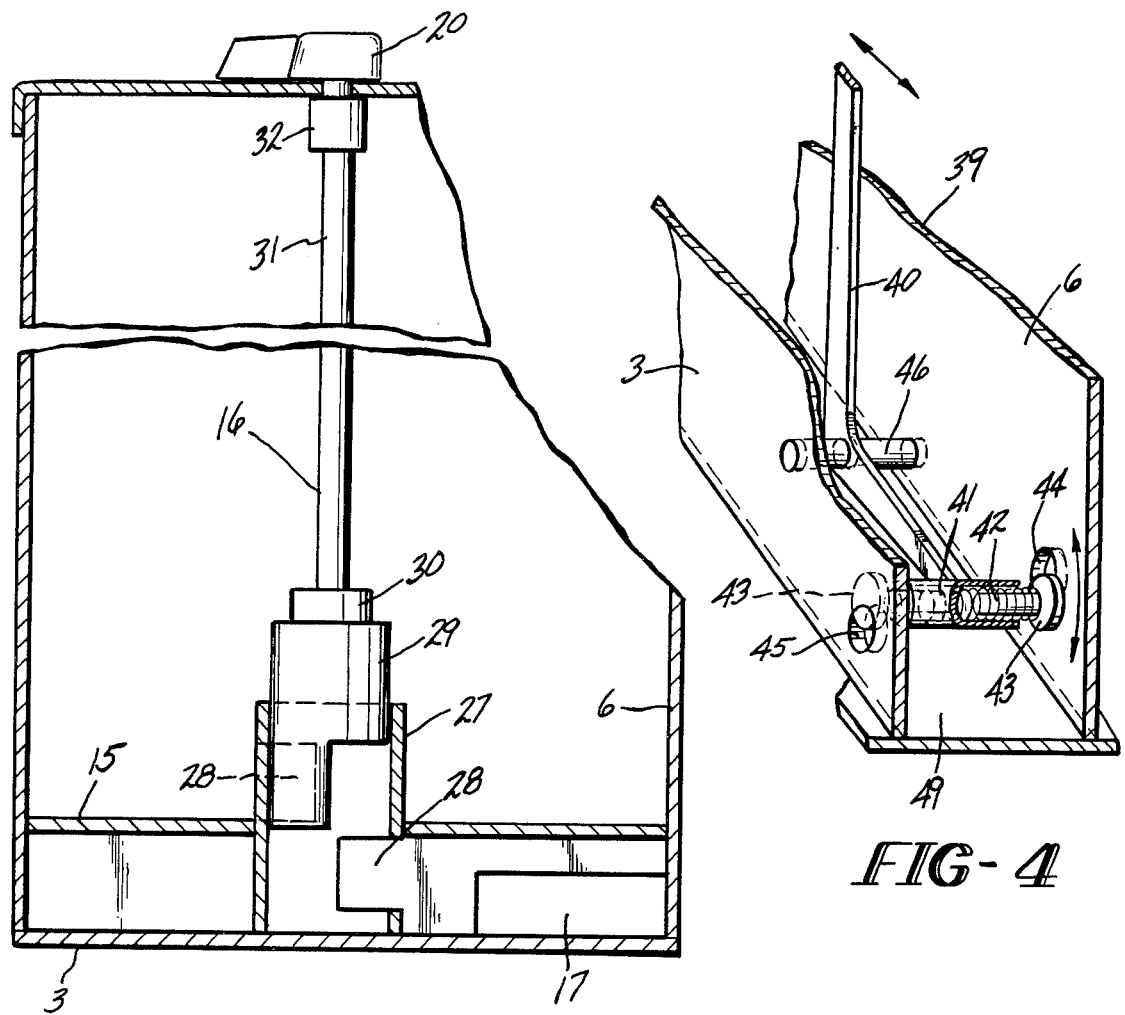
FIG-3
FIG-4
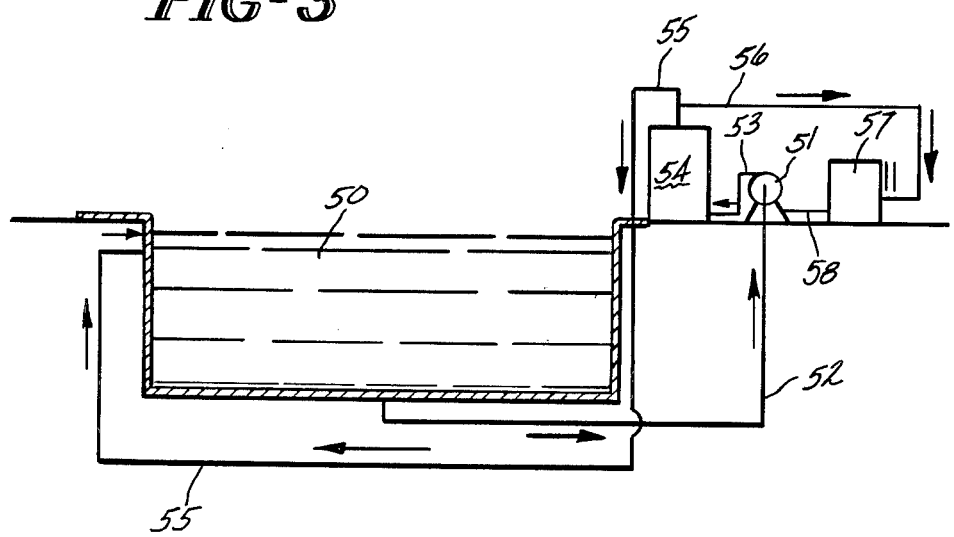
FIG-5

DISSOLVING AND DISPENSING WATER SOLUBLE MATERIAL CONTAINING AVAILABLE CHLORINE TO A SWIMMING POOL

This application is a continuation-in-part of co-pending application Ser. No. 285,714, filed Sept. 1, 1972 now abandoned.

This invention relates to a method for the preparation and controlled feeding of solutions of solid particulate material such as calcium hypochlorite. More particularly, the method provides for preparing aqueous solutions of water-soluble solids and dispensing said solutions at controlled rates. Still more particularly, this invention relates to a method for non-continuously supplying solutions containing available chlorine over a wide range of concentrations. In this method solid hypochlorite compositions in conveniently handled granular, pressed or tabletted form are dissolved at accurately controlled rates for use in a variety of chlorination and water treating applications requiring a wide range of available chlorine feed rates.

In the treatment of water supplies, particularly swimming pools, a supply of aqueous solution of an available halogen compound, preferably a hypochlorite, is commonly metered into a flowing body of the liquid to be treated. Sodium hypochlorite solutions are available commercially for this purpose at concentrations not exceeding 15 percent of available chlorine but such solutions deteriorate rapidly during shipment and storage. Solid sodium hypochlorite compositions are not available because they are very unstable. Calcium hypochlorite, on the other hand, can be shipped as a relatively stable solid containing 70 percent or more of available chlorine and can be stored under proper conditions for long periods without appreciable loss of available chlorine.

In spite of the advantages of solid calcium hypochlorite over other sources of available halogen for use as a sterilizing agent, there is a problem in applying the solid directly to water in such a manner that only a few parts per million of available chlorine are ultimately present in the water. In conventional methods of application in swimming pools, granular calcium hypochlorite is sometimes added directly to the water in the pool or tablets are placed in the skimmer or in dissolving baskets around the pool. Preferably, however, solid calcium hypochlorite is dissolved in water in the circulating system at a rate to maintain residual chlorine concentration generally from about 0.3 to about 1.5 parts per million in the pool.

In the treatment of water, for example, swimming pool water, with various chlorinating agents, it is recognized that there is frequently an accumulation of organic contaminants or of algae which are resistant to regular normal chlorination treatment. The oxidation or burn out of the organic material and the destruction of the algae requires periodically applying a superchlorination or shock-treatment available chlorine dosage to the pool water. This superchlorination treatment requires the addition of available chlorine in amounts which are greater than the amount normally used for chlorination. While the degree of superchlorination required depends on the available chlorine requirement of the particular pool being treated, it is recognized that superchlorination requires several times the amount of available chlorine normally used in one day. This method of treatment is described, for example, in the following publications: J. P. Faust and A. H. Gower, Water (Swimming Pools) in Kirk-Othmer Encyclopedia of Chemical Technology, N.Y., Interscience, Vol. 22, 1970, pp. 129–130; Swimming Pools, Menlo Park, Calif., Lane Book Co., 1964, pp. 78–79; and Strand, F. L., Why Chlorinate Swimming Pool Water, In Swimming Pool Age, 41, 56ff, July, 1967.

In addition to requiring large amounts of expensive chemicals, superchlorination may result in available chlorine concentrations which may temporarily prevent the swimming pool from being used. Where the chlorinating agents are organic compounds, such as the chloroisocyanurates, the additional organic material introduced may result in overstabilization of the pool water. This condition may require the disposal of part or all of the pool water.

It is an object of the present invention to provide a method of accurately controlling chemical solution feed rates independent of changes in pressure on the liquid treated.

It is another object of the present invention to provide a method of non-continuous release of solution containing dissolved available chlorine into water to be purified.

It is a further object of the method of the present invention to eliminate the need for periodically adding large amounts of available chlorine to effect superchlorination in the chlorination of bodies of water.

Briefly, the method of the present invention for dissolving and dispensing soluble material comprises accumulating a body of liquid in a receptacle and periodically discharging by rotary means the body of liquid to a dissolving zone. In the dissolving zone, the liquid contacts a soluble solid to form a solution which is then released into a body of liquid to be treated with the solution.

In general, the apparatus for use with the method of the present invention for dissolving and dispensing soluble material comprises in combination a closed container having an upper chamber and a lower chamber and at least one partition separating the chambers. The upper chamber is divided into a first and a second compartment by a partition having at least one opening in the lower part thereof. An inlet in the upper part of the first compartment introduces liquid from an external source into a receptacle housed in the first compartment. The receptacle is located below the inlet and is attached to the sidewalls of the first compartment. Means are provided for periodically instantaneously emptying liquid from the receptacle. Liquid flow between the first and the second compartment is regulated by flow control means. A magazine in the second compartment for holding soluble solids has a pervious lower end permitting the liquid from the recepacle to contact the solids. At least one opening is provided in the second compartment with means permitting liquid to flow between the second compartment and the lower chamber. The first compartment has at least one opening with flow control means for permitting liquid to flow between the first compartment and the lower chamber. An outlet in the lower chamber is equipped with flow control means which permits the regulation of liquid flow thru the outlet.

Accompanying FIGS. 1–4 illustrate a dispensing apparatus suitable for use with the method of the present invention.

FIG. 1 is a vertical cross section of one embodiment of the apparatus of the present invention. Corresponding parts have the same numbers in all FIGURES.

FIG. 2 is a top view of the embodiment of FIG. 1 with parts broken away.

FIG. 3 is an end view partially sectioned which is taken along the line 3—3 of FIG. 2.

FIG. 4 is a partial perspective view of an alternate embodiment of FIG. 3.

FIG. 5 is a diagrammatic plan of a swimming pool circulating system incorporating the dispensing apparatus of the present invention.

The dispensing apparatus as shown in FIG. 1, is divided into upper chamber 1 and lower chamber 2 by partition 3. Upper chamber 1 is separated into compartments 4 and 5 by partition 6. Liquid from an external source enters the apparatus by way of tube 7 passing thru flow indicator 8 and inflow valve 9 into inlet 10 attached to the upper part of wall 14 of compartment 4. Receptacle 11 is attached to the sidewalls of compartment 4 by means of a pair of trunnions 12. Receptacle 11 empties itself when the liquid volume reaches a predetermined level by pivoting on trunnions 12 stopping when the front edge of receptacle contacts protuberance 13.

Upon emptying, receptacle 11 returns to its original position, stopping when contacting inlet 10. Liquid from receptacle 11 flows down partition 3 to horizontal partition 15 where flow control means 16 regulates the rate of liquid flow from compartment 4 to compartment 5 thru channel 17. Magazine 18, having removable cover 60 and with the lower pervious end comprising grid 19 and supporting a liquid soluble particulate material (not shown), is contained in compartment 5. Dial control 20 attached to control valve 16 regulates the rate of liquid flow thru channel 17 in partition 6 and thus the height of the liquid column passing thru grid 19 containing the solid soluble particulate material to form a solution of the material. Dial control settings are indicated on cover 61 of compartment 4. From compartment 5 the solution formed passes thru drain 21 into chamber 2. Float 22 and valve 23 regulate the flow of solution from chamber 2 thru outlet 24. Overflow tube 25 allows any build-up of liquid which might occur in compartment 4 to flow directly into chamber 2 without contacting the liquid soluble particulate material.

FIG. 2 is a top view of the embodiment of FIG. 1. Orifice 26 in partition 15 permits liquid to by-pass control valve 16 and flow into compartment 5.

FIG. 3 illustrates an embodiment of low control means 16 between compartment 4 and 5 of upper chamber 1. Hollow cylinder 27 is attached to partition 3 and contains openings 28 for liquid flow. Inner cylinder 29 has a semicircular portion cut away at one end thereof and is free to rotate. It is attached to cylinder support 30 which is attached to rod 31 having a bushing 32 at the upper end thereof. Movement of dial control 20 alters the position of inner cylinder 29 and thus changes liquid flow thru openings 28 of cylinder 27 and thru channel 17.

FIG. 4 illustrates the partial perspective view of an additional embodiment of flow control means where an L-shaped member 40 attached to partitions 3 and 6 by pivot pin 46, has tube 41 attached at the end of the horizontal arm of the L. Tube 41 contains spring 42 and studs 43. Opening 44 in partition 6 and opening 45 in partition 3 are counter-positioned so that movement of member 40 increases the flow of liquid thru one opening while decreasing the flow thru the other.

FIG. 5 illustrates the use of the method of the present invention supplying chlorinated water to a swimming pool system including swimming pool 50, a pump 51 with its low pressure or suction side connected by conduit 52 to pool 50 and with its high pressure or outlet side by conduit 53 to filter 54. A portion of the water discharged from filter 54 thru conduit 55 passes thru conduit 56 into dispenser apparatus 57. Following chlorination, the water is discharged thru conduit 58 to pump 51, thru conduit 53 to filter 54 and thru conduit 55 to pool 50.

More in detail, the method of the present invention accumulates a volume of liquid in a receptacle and by rotary means releases precisely the same amount of liquid during each cycle. The controlled volume of liquid then contacts a soluble solid to consistently form accurately controlled solution concentrations. In a preferred embodiment, the solutions are released from the dispenser non-continuously, with the time required for releasing the solutions being only a portion of the time required for accumulating and discharging the liquid used to form the solution. For example, the time required for releasing the treated solution from the dispenser can be from about 10 to about 90 and preferably from about 15 to about 40 percent of the time required for accumulating and discharging the body of liquid from the receptacle.

The method of this invention may be used, for example, in treating swimming pool water with solutions containing available chlorine. By releasing the available chlorine-containing solutions non-continuously, a portion of the water being treated receives all of the available chlorine released and the available chlorine concentration of this portion of water is increased sufficiently to oxidize organic material and destroy algae present. This portion of the water is thus superchlorinated while the concentration of available chlorine in the pool is not increased above that normally desired.

During each cycle of operation, a portion of swimming pool water receives sufficient available chlorine to raise the available chlorine concentration for this portion of water above that required for superchlorination.

Available chlorine requirements for a swimming pool vary widely, depending on a variety of conditions. The available chlorine concentration is normally maintained within the range of from about 0.3 to about 2.0 and preferably from about 0.5 to about 1.5 parts per million of available chlorine. Superchlorination of swimming pool water requires an available chlorine dosage of for example, about 3.5 parts per million or greater and preferably from about 5 to about 10 parts per million of available chlorine, although higher concentrations may be used if desired.

As an illustration, a swimming pool containing 10,000 gallons of water is treated with about 6–8 ounces per day of calcium hypochlorite to maintain a normal available chlorine concentration from about 0.5 to about 1.5 parts per million. Periodic superchlorination of the pool water requires the addition of about 20 ounces of calcium hypochlorite, or from about 2.5 to about 3.3 times the normal available chlorine requirements.

The swimming pool system illustrated in FIG. 5 has a continuous recirculation of pool water when in operation. This recirculation rate is determined by the characteristics of the pool's filter system. For example, it is generally recommended that the total amount of water in the pool be recirculated in from about 6 to about 12 hours, but greater or lesser recirculation rates may be obtained. The water removed from the pool should have some available chlorine concentration, for example, from about 0.01 to about 1 part per million. Using the method of this invention of non-continuous dispensing of the concentrated aqueous solution containing available chlorine, only a portion of the recirculating water is therefore treated with the concentrated aqueous solution containing available chlorine. This portion can be from about 10 to about 65 and preferably from about 15 to about 50 percent of the amount of water being continuously recirculated. When this portion is treated, the available chlorine concentration is raised to at least 3.5 parts per million and preferably from about 5 to about 10 parts per million to superchlorinate so that undesirable organic matter is oxidized and algae destroyed. This treated portion is returned with the untreated portion of water to the pool where it is mixed with the water remaining in the pool to maintain an average available chlorine concentration in the pool from about 0.5 to about 1.5 parts per million.

The concentration of the aqueous solution containing available chlorine fed from the dispenser is such that if the solution were fed continuously to the water removed from the pool, the available chlorine concentration of the recirculated water would be less than that necessary to produce superchlorination.

Using the method of this invention, there is no need to periodically increase the amount of available chlorine-containing compound dispensed to the pool water to oxidize undesired organic materials or destroy algae.

The dispensing apparatus is suitably fabricated of metal or plastic depending on the solute and liquid with which it is to be used. When solid hypochlorites, for example, calcium hypochlorite, or solutions of hypochlorites are employed, the materials of construction are preferably those resistant to its action. Particularly suitable for this purpose are a considerable number of plastic compositions, for example, Lucite which has the additional advantage of transparency. The apparatus may also be constructed of other resins, for example, acrylonitrile-butadiene-styrene, Bakelite, nylon, polyethylene, polyvinyl chloride, and polystyrene and of suitable metals including stainless steels, and titanium.

The dispenser is designed to operate with liquid supplied at suitable pressures and may be operated without controlling means for liquid flow rates. In systems with highly variable liquid flow rates, it may be desirable, however, to equip the inlet with means to regulate liquid flow. In the case of treating swimming pool water, for example, control means combining a visual flow indicator and a valve member are useful in indicating a pressure build-up in the filter or at the hair and lint screen or to indicate that the check valve is functioning in case the filter pump stops. An example of a suitable inlet liquid flow control means is a combination of a floating ball flow indicator and a tee valve.

The receptacle for the liquid is self-emptying and provides for the instantaneous release of liquid on a periodic basis, controlled, for example, by a predetermined volume or weight of liquid. It can, for example, be shpaed generally cylindrical, ellipsoidal or circular, having at least one opening for solvent to enter and be discharged. In one embodiment, a tear drop shaped receptacle of about one quart capacity is attached to the walls of the container, for example, by a pair of trunnions or pivot pins and is carefully balanced so that upon emptying the liquid it returns to its original position. A stopping means for maintaining the receptacle at a suitable position for filling may be provided by the appropriate length of the inlet or, for example, by attaching a plastic or rubber cylinder to at least one side of the first compartment.

One or more orifices are provided in the first compartment to permit flow of liquid to the second compartment and/or the lower chamber when the dispensing device is operating to produce solutions of low concentration.

Flow of liquid from the first compartment to the second compartment is regulated by the flow control means, for example, a valve member selected to provide a wide range of flow rates. Suitable examples are illustrated in FIGS. 3 and 4.

The supply magazine has the form, for example, of a hollow rectangular or cylindrical solid having a pervious lower end. The magazine is insertable into the second compartment of the upper chamber and stop means are provided to establish the level of the pervious lower end of the magazine at an appropriate distance above the bottom of the compartment. The pervious lower end can be, for example, a grid of suitable mesh attached to the magazine and made integral therewith. The magazine can be removable from or made integral with the second compartment. A removable cover permits the magazine to be filled with soluble material in a form which is suitable for dissolving in the liquid being supplied to the apparatus of the invention.

The lower portion of the magazine is periodically submerged in liquid, with the volume of the submerged portion usually being no greater than about 5 per cent of the total volume of the magazine. The extent of contact is regulated by the manually adjusted flow control means.

As soluble material dissolves at the pervious end of the magazine and is removed, the soluble material originally in the air space above and not wetted by liquid, gradually descends to the pervious end to replace that dissolved. Only soluble material about to be dissolved is contacted by liquid flowing across the pervious end of the magazine.

Suitable drain means are provided to permit the flow of solution between the magazine compartment and the lower chamber. Drain means suitably notched to minimize plugging by non-dissolved particles can be employed. Drain means with a variable size orifice can be advantageously used where particulate materials of differing degrees of solubility are employed with a common solvent.

Flow control means is provided from the first compartment to the lower chamber. A suitable example is an overflow tube which prevents the build up of liquid in the first compartment.

Release of solution from the lower chamber to the liquid to be treated is controlled by a valve member, a float valve, for example, so arranged that air is prevented from being drawn into the pump suction line causing undesired introduction of air into the recirculating system.

The dispenser is designed to operate with liquid supplied at suitable pressure and to release the solution at or below atmospheric pressure into the liquid to be treated.

The receptacle accumulates a volume of liquid and periodically releases this liquid to a dissolving zone wherein the liquid contacts a soluble material in the lower end of the magazine to form a solution containing a carefully controlled amount of the soluble material. By releasing precisely the same amount of liquid during each cycle, accurately controlled solution concentrations are consistently obtained for a particular setting of the dial control. A wide range of concentrations are available, for example, when dissolving solid calcium hypochlorite in water for swimming pool treatment, available chlorine in amounts of from zero to greater than 4,000 grams per day can be supplied. Currently available erosion type dispensing devices for chlorinating swimming pools cannot provide a zero feed rate of available chlorine while operating, nor can they feed more than approximately 600 grams of available chlorine per day.

The method of the present invention is used particularly advantageously when it is desired to dispense solutions of soluble solid materials supplied in a suitable form at accurately controlled rates. These rates are varied by controlling the volume of liquid in contact with the soluble material. The method of this invention is particularly useful in the application of solid hypochlorites, for example, calcium hypochlorite, to bodies of water, for example, in treating water in swimming pools, water plants in small municipalities, bottling plants, dairies and cooling systems where the addition of a sterilizing agent or other chemical is desirable. The method also can be advantageously used in the treatment of industrial wastes to destroy color, odor, and toxic constituents, and for odor and bacterial control in sewage effluents. Pressed tablets of hypochlorite are especially suitable in the present apparatus, but granular shapes and sizes of particles are also suitable. The method can be used for dissolving and feeding other chemicals, for example, sodium fluoride in minor amounts for water supplies, polyphosphates and compositions containing them for water softening, soda ash furnished as briquettes or fused soda ash for adjusting the alkalinity of aqueous bodies, sodium chloride, alum and available chlorine compounds other than hypochlorite including, for example, dichlorocyanuric acid and salts thereof, trichlorocyanuric acid and salts thereof, tetrachloroglycoluril, 1,3-dichloro-5,5-dimethylhydantoin and 1-chloro-3-bromo-5,5-dimethylhydantoin.

The following examples are presented to illustrate the invention more fully. All parts and percentages are by weight unless otherwise specified.

EXAMPLE I

A dissolving and dispensing apparatus, substantially as shown in FIGS. 1-2, was fabricated substantically of polymethyl methacrylate. The tear drop shaped receptacle had a capacity of approximately one quart of liquid. The magazine had a grid forming the pervious end and was filled with tabletted calcium hypochlorite containing at least 70 percent $Ca(OCl)_2$. The flow control valve between the first and second compartment of the upper chamber is the valve shown in FIG. 3. A loose fitting cap for the supply cartridge was provided.

The described dispenser was connected to a test stand simulating a swimming pool installation to test uniformity in maintaining available chlorine levels.

The test stand consisted of a stirred tank having a capacity of 150 gallons of water.

Fresh water at a temperature of 71°F. was added to the dispensing device at the rate of 14 gallons per hour.

At a dial control setting of 1, the dispensing apparatus was operated for a period of 7½ hours with the treated solution being retained in the stirred tank. Periodic analysis showed a uniform available chlorine concentration of 21.6 parts per million.

EXAMPLE II

The dissolving and dispensing apparatus of example I was used in a 25,000 gallon swimming pool installation such as illustrated in FIG. 5. Water, having a total hardness in the range of 650–900 parts per million, was withdrawn from the pool thru a plastic conduit, using the low pressure side of a pump. The high pressure side of the pump forced water thru a cartridge filter and into a plastic conduit having a smaller plastic line connected to it. This plastic line supplied water thru the inlet of the dispensing apparatus to a receptacle of 1 quart capacity at the rate of approximately 1 quart per minute. The magazine of the dispensing apparatus was filled with calcium hypochlorite tablets ⅜ inch thick and ¾ inch in diameter.

At a dial control setting of 2, the available chlorine residual in the pool was maintained at 1.0 to 1.5 parts per million for a period of greater than 90 days. The temperature of the water averaged about 80° to 85°F. in the pool located in an unshaded area and without a screened enclosure. The pump was operated for about 12 hours per day. During the period of operation, the dispenser apparatus required no cleaning nor other maintenance.

What is claimed is:

1. A method of dissolving and dispensing a water soluble material containing available chlorine to a swimming pool having a recirculation system including means for continuously recirculating water from said pool while maintaining the average concentration of said available chlorine in said pool from about 0.5 to about 1.5 parts per million which comprises:
   a. accumulating a body of water from said recirculating water in a rotary receptacle,
   b. discharging periodically said body of water to a dissolving zone by rotating said receptacle,
   c. contacting said body of water in said dissolving zone with said water soluble solid material containing available chlorine to form an aqueous solution containing available chlorine, and
   d. non-continuously dispensing said aqueous solution to treat a portion of said recirculated water such that said available chlorine concentration of said treated portion is at least about 3.5 parts per million, where the time required for dispensing said aqueous solution is from about 10 to about 90 percent of the time required for said accumulating and said discharging said body of water.

2. The method of claim 1 in which said time required for said dispensing of said aqueous solution is from about 15 to about 40 percent of the time required for said accumulating and said discharging said body of water.

3. The method of claim 1 in which said treated portion is from about 10 to about 65 percent of the amount of said recirculated water from said pool.

4. The method of claim 3 in which said treated portion is from about 15 to about 50 percent of the amount of said recirculated water from said pool.

5. The method of claim 1 in which the available chlorine concentration of said treated portion is from about 5 to about 10 parts per million.

6. The method of claim 1 in which said water soluble material containing available chlorine is selected from the group consisting of calcium hypochlorite, dichlorocyanuric acid and salts thereof, trichlorocyanuric acid and salts thereof, tetrachloroglycoluril, 1,3-dichloro-5,5-dimethylhydantoin and 1-chloro-3-bromo-5,5-dimethylhydantoin.

7. The method of claim 6 in which said soluble material is calcium hypochlorite.

* * * * *